United States Patent
Baumbach et al.

(10) Patent No.: US 6,790,485 B2
(45) Date of Patent: Sep. 14, 2004

(54) PROCESS FOR COATING SUBSTRATES

(75) Inventors: Beate Baumbach, Leverkusen (DE); Wolfgang Fischer, Meerbusch (DE); Christian Füssel, Tönisvorst (DE); Diethelm Rappen, Rheinberg (DE); Jan Weikard, Odenthal-Erberich (DE)

(73) Assignee: Bayer Aktiengesellschaft, Leverkusen (DE)

( * ) Notice: Subject to any disclaimer, the term of this patent is extended or adjusted under 35 U.S.C. 154(b) by 65 days.

(21) Appl. No.: 10/016,061

(22) Filed: Oct. 31, 2001

(65) Prior Publication Data

US 2002/0081391 A1 Jun. 27, 2002

(30) Foreign Application Priority Data

Nov. 6, 2000 (DE) .......................................... 100 54 933

(51) Int. Cl.⁷ .............................. B05D 3/02; B05D 3/06
(52) U.S. Cl. .................... 427/508; 427/385.5; 427/558; 427/595
(58) Field of Search ................................ 427/508, 487, 427/558, 595, 385.5; 430/280.1, 281.1, 288.1, 913, 927

(56) References Cited

U.S. PATENT DOCUMENTS

| 3,256,226 A | * | 6/1966 | Fekete et al. .................. 525/7 |
| 4,366,109 A | | 12/1982 | Svoboda ...................... 264/255 |
| 4,961,960 A | | 10/1990 | Iimure ........................ 427/54.1 |
| 5,229,252 A | * | 7/1993 | Flynn et al. .............. 430/280.1 |
| 5,916,979 A | * | 6/1999 | Koegler et al. .............. 525/440 |
| 6,620,857 B2 | * | 9/2003 | Valet ............................ 522/42 |

FOREIGN PATENT DOCUMENTS

| CA | 2258813 | 9/1999 |
| EP | 0 501 433 A1 | 9/1992 |
| EP | 0 902 040 A1 | 3/1999 |

* cited by examiner

*Primary Examiner*—Elena Tsoy
(74) *Attorney, Agent, or Firm*—Joseph C. Gil; Thomas W. Roy; Gary F. Matz

(57) ABSTRACT

The present invention relates to a process for coating a substrate by applying to a substrate a coating composition containing A) at least one compound which contains at least two (meth)acrylate groups and at least one isocyanate-reactive group and which is free from isocyanate groups and blocked isocyanate groups, B) at least one blocked polyisocyanate, which does not contain any ethylenically unsaturated groups and C) at least one photoinitiator, curing the coating composition by the action of UV light and post-curing by increasing the temperature of the coating.

8 Claims, No Drawings

PROCESS FOR COATING SUBSTRATES

BACKGROUND OF THE INVENTION

1. Field of the Invention

The present invention relates to a process for coating a substrate in which certain liquid coating compound compositions, after being applied to a body (substrate), are cured by irradiation with ultraviolet (UV) light and thermal post-reaction.

2. Description of the Prior Art

Curing coating compositions or lacquers, by UV light, is very efficient due to the low energy and solvent consumption and the high speed. A disadvantage often cited, however, is that of inadequate adhesion of the coatings to certain substrates, inter alia, metal. For example, EP-A 0 928 800 describes a coating system of urethane (meth)acrylate isocyanates, which contains free isocyanate (NCO) groups and groups which react with NCO groups. For this reason the coating system is prepared as two components which are mixed only shortly before application of the coatings. After mixing the pot life is limited to a few hours.

A one-component system (with regard to the storage of the coating composition) is described, e.g., in U.S. Pat. No. 4,961,960. The system contains a) a light-curing monomer or polymer having a plurality of ethylenically unsaturated groups and b) an adduct of a polyisocyanate, a blocking agent for polyisocyanates and a photo-polymerizable alcohol having at least one ethylenically unsaturated group. Moreover, the requirement is made that component a) is free from NCO groups or blocked NCO groups and that the sum of the ethylenically unsaturated groups contained in a) and b) is at least 4. It is described that the use of polyisocyanates b) that do not contain ethylenically unsaturated group(s), without thermal post-curing, leads to non-resistant films, and with thermal post-curing to films with an inadequate appearance.

Because polyisocyanate products that contain both ethylenically unsaturated groups and blocked NCO groups are difficult to prepare, an object of the present invention is to provide a process for coating which, even with the use of blocked polyisocyanates in combination with UV-curing oligomers or polymers, leads to coatings which are resistant after UV curing and, after additional thermal curing, to optically perfect coatings.

This object may be achieved according to the present invention as described hereinafter.

SUMMARY OF THE INVENTION

The present invention relates to a process for coating a substrate by applying to a substrate a coating composition containing A) at least one compound which contains at least two (meth)acrylate groups and at least one isocyanate-reactive group and which is free from isocyanate groups and blocked isocyanate groups, B) at least one blocked polyisocyanate, which does not contain any ethylenically unsaturated groups and C) at least one photoinitiator, curing the coating composition by the action of UV light and post-curing by increasing the temperature of the coating.

DETAILED DESCRIPTION OF THE INVENTION

The term "(meth)acrylate", within the meaning of the invention, relates to esters of acrylic acid and/or methacrylic acid.

Component A) is selected from known radiation-curing binders, provided that the binders contain at least isocyanate-reactive group, preferably at least one hydroxyl group. Examples of these binders include epoxy acrylates, polyester acrylates, polyether acrylates or partially (meth) acrylated trifunctional or higher functionality alcohols having a molecular weight below 600. The use of epoxy acrylates preferably having an average of 1.5 to 3 hydroxyl groups is preferred. Component A) may preferably contains 2 to 4 ethylenically unsaturated groups.

The preparation of epoxy acrylates is described, for example, in P.K.T. Oldring (Ed.), Chemistry & Technology of UV & EB Formulations For Coatings, Inks & Paints, Vol. 2, 1991, SITA Technology, London, p. 37 –68 and in EP-A 816 412. Glycidyl ethers are usually reacted with carboxylic acids and the resulting products contain secondary hydroxyl groups. These products are preferred for the process according to the invention.

Polyester acrylates containing hydroxyl groups and having an OH number of 60 to 300 mg KOH/g may also be used as component A). To prepare the hydroxy-functional polyester acrylates, the following monomers may be used:

1. (Cyclo)alkane diols (i.e., dihydric alcohols with (cyclo) aliphatically bound hydroxyl groups) having a molecular weight of 62 to 286, such as ethane diol, propane 1,2- and 1,3-diol, butane 1,2-, 1,3-and 1,4-diol, pentane 1,5-diol, hexane 1,6-diol, neopentyl glycol, cyclohexane-1,4-dimethanol, cyclohexane 1,2- and 1,4-diol, 2-ethyl-2-butylpropane diol. Also suitable are diols containing ether oxygens such as diethylene glycol, triethylene glycol, tetraethylene glycol, dipropylene glycol, tripropylene glycol, polyethylene, polypropylene or polybutylene glycols having a maximum number average molecular weight of 2000, preferably 1000, and more preferably 500. Reaction products of the above-mentioned diols with ε-caprolactone or other lactones may also be used as diols.

2. Trihydric and higher functionality alcohols having a molecular weight of 92 to 254 such as glycerol, trimethylolpropane, pentaerythritol, dipentaerythritol and sorbitol. Also suitable are polyethers started on these alcohols such as the reaction product of 1 mole of trimethylolpropane with 4 moles of ethylene oxide.

3. Monoalcohols such as ethanol, propan-1-ol, propan-2-ol, butan-1-ol, butan-2-ol, hexan-1-ol, 2-ethylhexanol, cyclohexanol and benzyl alcohol.

4. Dicarboxylic acids having a molecular weight of 104 to 600 and/or the anhydrides thereof, such as phthalic acid, phthalic anhydride, isophthalic acid, tetrahydrophthalic acid, tetrahydrophthalic anhydride, hexahydrophthalic acid, hexahydrophthalic anhydride, cyclohexane dicarboxylic acid, maleic anhydride, fumaric acid, malonic acid, succinic acid, succinic anhydride, glutaric acid, adipic acid, pimelic acid, suberic acid, sebacic acid, dodecanedioic acid and hydrogenated dimer fatty acids.

5. Higher functionality carboxylic acids and the anhydrides thereof such as trimellitic acid and trimellitic anhydride.

6. Monocarboxylic acids such as benzoic acid, cyclohexane carboxylic acid, 2-ethylhexanoic acid, caproic acid, caprylic acid, capric acid, lauric acid, natural and synthetic fatty acids.

7. Acrylic acid, methacrylic acid and dimeric acrylic acid.

Polyester acrylates containing hydroxyl groups contain the reaction product of at least one compound from group 1 or 2 with at least one compound from group 4 or 5 and at least one compound from group 7.

It is also possible to react a portion of (excess) carboxyl groups, particularly (meth)acrylic acid, with mono-, di- or polyepoxides. This reaction may be used particularly to increase the OH number of the polyester acrylate since one OH group is produced during the epoxide-acid reaction. The acid number of the resulting product is less than 20 mg KOH/g, preferably less than 10 mg KOH/g and more preferably less than 5 mg KOH/g.

The preparation of polyester acrylates is described, for example, in P.K.T. Oldring (Ed.), Chemistry & Technology of UV & EB Formulations For Coatings, Inks & Paints, Vol. 2, 1991, SITA Technology, London, p. 123–135.

It is also possible to use reaction products of the above-mentioned epoxy acrylates, polyester acrylates, polyether acrylates or partially (meth)acrylated trifunctional or higher functionality alcohols having a molecular weight below 600 with di- or polyisocyanates as long as the reaction products contain at least one isocyanate-reactive group, preferably at least one hydroxyl group. Suitable di- or polyisocyanates include (cyclo)aliphatic, araliphatic and aromatic compounds, such as butylene diisocyanate, hexamethylene diisocyanate (HDI), isophorone diisocyanate (IPDI), trimethylhexamethylene diisocyanate (2,2,4 and/or 2,4,4-trimethylhexamethylene diisocyanate), bis(isocyanatocyclohexyl)methane, toluene diisocyanate, diphenylmethane diisocyanate, isocyanatomethyl-1,8-octane diisocyanate and derivatives of these diisocyanates containing urethane, isocyanurate, allophanate, biuret, uretdione and/or iminooxadiazine dione groups.

Suitable blocked polyisocyanates for use as component B), which contain no ethylenically unsaturated groups, are known and described, for example, in Progress in Organic Coatings, Vol. 36, 3, 1999, 148–172. Blocked polyisocyanates are generally prepared by reacting a polyisocyanate with a blocking agent.

Suitable polyisocyanates include (cyclo)aliphatic, araliphatic and aromatic compounds, preferably (cyclo) aliphatic compounds. Examples include butylene diisocyanate, hexamethylene diisocyanate (HDI), isophorone diisocyanate (IPDI), trimethylhexamethylene diisocyanate (2,2,4 and/or 2,4,4-trimethylhexamethylene diisocyanate), bis(isocyanatocyclo-hexyl)methane, isocyanatomethyl-1,8-octane diisocyanate, derivatives of these diisocyanates containing urethane, isocyanurate, allophanate, biuret, uretidione and/or iminooxadiazine dione groups and mixtures thereof. The derivatives of HDI and/or IPDI containing isocyanurate groups are particularly preferred.

Suitable blocking agents are known and include monofunctional blocking agents such as malonates, acetates, lactams, oximes, pyrazoles, triazoles, imidazoles, amines and mixtures thereof. The use of blocking agents that dissociate at a temperature of up to 180° C., preferably of up to 160° C., is particularly preferred. Diisopropylamine, butanone oxime, cyclohexanone oxime and/or 3,5-dimethylpyrazole are preferred. Diisopropylamine is particularly preferred.

The equivalent ratio of blocked NCO groups in B) to isocyanate-reactive groups in A) is 1:0.2 to 1:2, preferably 1:0.5 to 1:1.2 and more preferably 1:0.9 to 1:1.

Photoinitiators C) are known and include initiators which are able to initiate free-radical polymerization after irradiation with high-energy radiation such as UV light. Suitable photoinitiators are described, for example, in P.K.T. Oldring (Ed.), Chemistry & Technology of UV & EB Formulations For Coatings, Inks & Paints, Vol. 3, 1991, SITA Technology, London, p. 61–325. Examples include 2-hydroxyphenyl ketones such as 1-hydroxycyclohexyl-phenyl ketone; benzil ketals such as benzil dimethyl ketal; acylphosphine oxides such as bis-(2,4,6-trimethylbenzoyl)phenylphosphine oxide; diacylphosphine oxides; benzophenone; and derivatives thereof. They are used individually or in mixtures, optionally together with accelerators or co-initiators. They are used in amounts of 0.1 to 10 parts by wt., preferably 2 to 7 parts by wt. and more preferably 3 to 4 parts by wt, based on solids content of the coating composition.

In order to prepare the coating composition, components A), B) and C) are mixed by conventional methods. Known additives used in coating technology, particularly the technology of radiation-curable coatings and polyurethane chemistry, may also added to the coating compositions.

In order to obtain weathering resistance for the cured coating and optionally the substrate, a UV absorber, preferably with an absorption range up to max. 390 nm and a known as HALS (HALS=hindered amine light stabiliser) stabilizer may be added. Suitable UV absorbers include triphenyltriazines such as Tinuvin 400 (Ciba) or oxalic acid dianilides such as Sanduvor 3206 (Clariant). The UV absorbers are preferably added in amounts of 0.5% to 3.5%, based on solid binder.

Suitable HALS include Tinuvin 292 or Tinuvin 123 (Ciba) or Sanduvor 3058 (Clariant). These HALS are preferably added in amounts of 0.5% to 2.5%, based on solid binder. The use of HALS and UV absorbers in combination with photoinitiators is well known and described, for example, in A. Valet, Lichtschutzmittel für Lacke, Vincentz Verlag, Hanover, 1996.

The addition reaction of the isocyanate groups liberated during post-curing with the isocyanate-reactive groups may be accelerated in an known manner using suitable catalysts such as tin octoate, dibutyltin dilaurate or tertiary amines.

Examples of other coating additives include deaerating agents such as polyacrylates, coupling agents such as aminoalkyltrialkoxy silanes and flow control agents such as polysiloxanes.

In addition to the preparation of clear coats, it is also possible to prepare colored coatings by adding dyes or pigments. As is known, the photoinitiator must be adapted to colored coating compounds e.g., by proportional use of a photoinitiator with a long-wave (>350 nm) absorption band.

Depending upon the method of application selected, the viscosity of the coating composition may be suitably adjusted by adding solvents. Suitable solvents include those that are inert towards blocked isocyanate groups and C=C double bonds such as esters, ketones, ethers, ether esters, alkanes and aromatic solvents such as xylenes or toluene.

When a substrate is coated in accordance with the invention, the coating composition is applied to various substrates by conventional methods such as spraying, roller coating, knife coating, pouring, brushing, centrifugal force, or dipping, preferably by spraying or roller coating. Examples of suitable substrates include glass, metals (such as aluminium or steel sheets which have optionally undergone a pretreatment or metal in the form of coils), non heat-sensitive wood or plastic materials, mineral materials (such as cement, clay, minerals or ceramics), or substrates that have already been coated or primed, e.g., automobiles or automobile parts. It is also possible to coat substrates composed of several of the materials mentioned.

The coating system is cured in successive steps:

Step 1: By flashing off optionally added solvents. This takes place at room temperature or at elevated temperature, preferably up to 80° C. Optionally also by means of a stream of heated gas (e.g. air). The temperature increase may be brought about by known methods such as infrared or near-infrared radiators or by ovens heated in other ways.

Step 2: By UV curing using, for example, commercial mercury high- or medium-pressure radiators. These radiators may be doped by other elements and preferably have an output of 80 to 240 W/cm lamp length. Excimer radiators which emit UV light with wavelengths of 160 nm to 400 nm are also suitable. Surprisingly, it was found that although the coating at this time still contains the uncrosslinked constituent B), the surfaces obtained are already dust-dry and resistant to many solvents.

Step 3: By crosslinking the NCO-containing constituents with the isocyanate-reactive compounds. At elevated temperatures in the coating, reactive groups, preferably NCO groups, are produced initially from the blocked isocyanates. This takes place at temperatures above 80° C. and below 450° C. The residence times of the coatings at these temperatures is at least 10 seconds, advantageously at least 60 seconds to 60 minutes and more preferably at least 2 to 10 minutes. The temperature may be increased by known methods such as infrared or near-infrared radiators or by ovens heated in other ways. When post-curing is complete, a cooling phase may follow before the coated articles undergo further handling.

It was surprising that, during post-curing, the blocking agents formed when the NCO groups are unblocked and which are volatile at these temperatures do not lead to disturbance of the film or surface. As the examples below illustrate, defect-free, optically attractive coatings are obtained.

The invention is further illustrated but is not intended to be limited by the following examples in which all parts and percentages are by weight unless otherwise specified.

EXAMPLES

The following formulations were prepared (details in wt. %), applied and tested.

| Example no.: | 1 | 2 | 3 | 4 |
|---|---|---|---|---|
| Roskydal UA VP LS 2266 | 53.13 | 53.94 | | |
| Ebecryl 600 | | | 51.39 | 52.96 |
| Irgacure 184 | 2.18 | 2.18 | 2.18 | 2.18 |
| Desmodur VP LS 2352 | 30.29 | | | |
| Desmodur BL 3370 | | 26.96 | | |
| Desmodur VP LS 2307 | | | 35.70 | |
| Desmodur BL 3475 | | | | 26.47 |
| n-butyl acetate | 14.40 | 16.91 | 10.72 | 18.39 |
| Total | 100.0 | 100.0 | 100.0 | 100.0 |
| Solids content | 75.0% | 75.0% | 75.0% | 75.0% |
| Approx. flow time DIN 4 cup | 70 s | 70 s | 70 s | 70 s |

Remarks

Roskydal UA VP LS 2266 (Bayer AG, Leverkusen, Germany)—epoxy acrylate, viscosity about 8000 mPa·s, molecular weight about 700 g/mole, double bond density 5 gram equivalent/kg.
Ebecryl 600 (UCB GmbH, Kerpen, Germany)—epoxy acrylate based on a bisphenol A resin, viscosity about 3000 mPa·s at 60° C. Irgacure 184 (Ciba Spezialitatenchemie, Lampertheim, Germany)—photoinitiator.

Desmodur VP LS 2352 (Bayer A G, Leverkusen, Germany) HDI and IPDI-based polyisocyanate blocked with amine [blocked NCO content 7.8%, about 65% solution in solvent naphtha 100/1-methoxypropyl acetate-2/isobutanol (6.4:14.3:14.3)].
Desmodur BL 3370 (Bayer AG, Leverkusen, Germany)—HDI-based polyisocyanate blocked with amine and alcohol (blocked NCO content 8.9%, 70% in 1-methoxypropyl acetate).
Desmodur VP LS 2307 (Bayer AG, Leverkusen, Germany)—aliphatic polyisocyanate based on HDI, IPDI and bis(isocyanatocyclohexyl)methane blocked with malonic acid dialkyl ester (blocked NCO content 6.4%, about 60% in isobutanol/1-methoxypropyl acetate-2, 2:1).
Desmodur BL 3475 (Bayer AG, Leverkusen, Germany)—HDI and IPDI-based polyisocyanate blocked with alcohol (blocked NCO content 8.2%, 75% in solvent naphtha 100/butyl acetate, 1:1).

Each coating formulation was applied with a knife to 2 aluminium sheets, and the solvent was largely removed by flashing off for 5 minutes at room temperature. Curing was then carried out with UV light and the resistances were tested on one coated sheet in each case. The other sheets were dried for an additional 87 s at 125° C. in a circulating air oven. The resistances were tested once again.

| Example | 1 | 2 | 3 | 4 |
|---|---|---|---|---|
| UV curing: 1 Hg high-pressure radiator 120 W/cm, belt speed 5 m/min | | | | |
| Film thickness μm | 6–7 | 6–7 | 6–7 | 5–6 |
| Surface after UV drying | Touch dry | Touch dry | Touch dry | Touch dry |
| Methyl ethyl ketone resistance* | 0 | 0 | 0 | 0 |
| Isopropanol resistance* | 0 | 0 | 0 | 0 |
| 10% H₂O/15 min after UV curing | | | | |
| Adhesion in crosscut test* | | | | |
| after UV drying | 1 | 2 | 3 | 4 |
| after UV drying + 87 s at 125° C. | 0 | 0–1 | 0 | 0 |

*Evaluation according to the rating 0 = very good, 5 = poor.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A process for coating a substrate by
(1) applying to a substrate a coating composition consisting essentially of
A) at least one compound which contains at least two (meth)acrylate groups and at least one isocyanate-reactive group and which is free from isocyanate groups and blocked isocyanate groups,
B) at least one blocked palyisocyanate, which does not contain any ethylenically unsaturated groups
C) at least one photoinitiator, and
D) optionally one or more components selected from the group consisting of UV absorbers, catalysts, deaerating agents, coupling agents, flow control agents, solvents, dyes, and pigments, and
(2) curing the coating composition by a curing process consisting essentially of
(i) optionally flashing off solvents,
(ii) applying the action of UV light to the coating causing a solvent resistant surface to form on the coating, and

(iii) post-curing by increasing the temperature of the coating.

2. The process of claim 1 wherein component A) contains 2 to four ethylenically unsaturated groups.

3. The process of claim 1 wherein component A) comprises an epoxy acrylate.

4. The process of claim 2 wherein component A) comprises an epoxy acrylate.

5. The process of claim 1 wherein the polyisocyanate of component B) is blocked with a blocking agent comprising diisopropylamine.

6. The process of claim 2 wherein the polyisocyanate of component B) is blocked with a blocking agent comprising diisopropylamine.

7. The process of claim 3 wherein the polyisocyanate of component B) is blocked with a blocking agent comprising diisopropylamine.

8. The process of claim 4 wherein the polyisocyanate of component B) is blocked with a blocking agent comprising diisopropylamine.

* * * * *